United States Patent [19]

Schmitz et al.

[11] 4,052,918
[45] Oct. 11, 1977

[54] TOOL HEAD MOUNTING ARRANGEMENT FOR A LATHE

[75] Inventors: Hermann Schmitz, Mettmann; Ferdinand Wellisch, Neuss, both of Germany

[73] Assignee: Sandvik Aktiebolag, Aandviken, Sweden

[21] Appl. No.: 703,223

[22] Filed: July 7, 1976

[30] Foreign Application Priority Data

July 25, 1975 Germany .............................. 2533393

[51] Int. Cl.² ............................................. B23B 29/00
[52] U.S. Cl. ................................................. 82/36 R
[58] Field of Search ....................... 82/36 R, 36 B, 37

[56] References Cited

U.S. PATENT DOCUMENTS

| | | | |
|---|---|---|---|
| 2,540,568 | 2/1951 | Clatfelter | 82/36 R |
| 3,545,319 | 12/1970 | Anderson et al. | 82/36 R |
| 3,785,228 | 1/1974 | Clagett et al. | 82/36 B |
| 3,948,123 | 4/1976 | Dams et al. | 82/36 R |
| 3,982,452 | 9/1976 | Scheiffele | 82/36 R |

*Primary Examiner*—Harrison L. Hinson
*Attorney, Agent, or Firm*—Burns, Doane, Swecker & Mathis

[57] ABSTRACT

A tool head mounting arrangment in a turning machine of the type having a carrier and tool head clamped against seating surfaces therein. The tool head is adjustable in position relative to the workpiece. The carrier contains an opening for receiving the tool head. The opening includes an upper seating surface and a lower seating surface against which the tool head rests.

10 Claims, 7 Drawing Figures

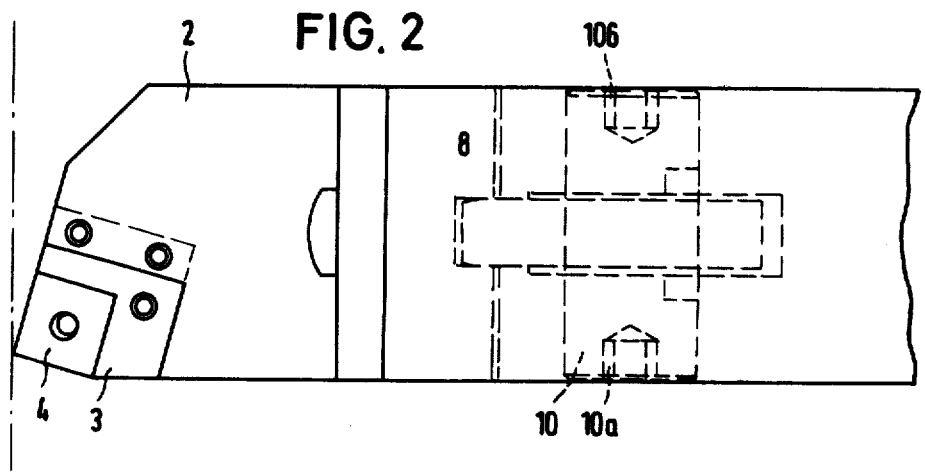
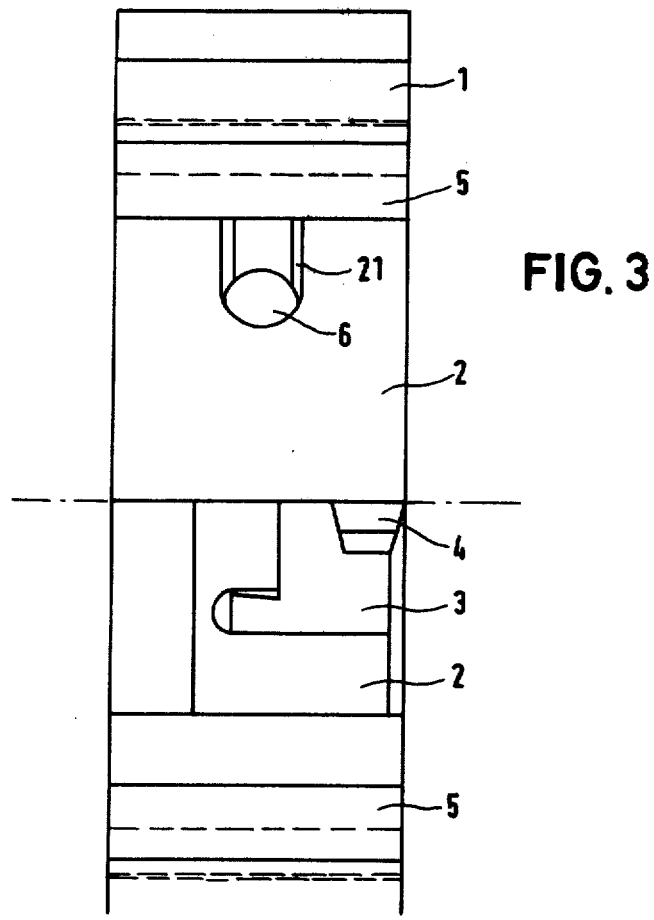

TOOL HEAD MOUNTING ARRANGEMENT FOR A LATHE

BACKGROUND AND OBJECTS

The invention relates to a tool head arrangement in a turning machine or lathe, preferably a turning machine of slide design for heavy duty working, wherein the tool head is clamped against corresponding seating surfaces of a carrier and is adjustable in relation to the workpiece.

In the case of known machine tools of the type mentioned, the tool head carrying the cutting insert is placed essentially from above onto corresponding fitting or seating surfaces of the carrier, especially of slides. At the same time, by the term "from above", is meant the direction which corresponds to the rotational direction of the workpiece, whenever the tool head operates in its normal position. In the following description, the terms "above" and "below" are to be understood correspondingly. In the case of the known machine tools, as explained earlier, the surfaces resisting the cutting pressure lie therefore somewhat in the direction of the cutting force, as a result of which a good support for the latter is assured. The known arrangement of the tool heads, especially in the case of large machines, results in certain difficulties involving insertion of the heads. In addition, the support is not necessarily secure in regard to forces which are directed counter to the normal cutting force.

The present invention is based on the task of creating a tool head mounting arrangement of the initially mentioned type wherein a secure hold of the head is guaranteed, even in the case of variable directions of the force.

BRIEF DESCRIPTION

According to the invention, this will be achieved through the fact that the tool head is inserted into an opening of the carrier facing the workpiece, the carrier having "upper" and "lower" contact surfaces for the tool head. Preferably, the opening can be a dove-tailed guide extending essentially in a direction parallel to the axis of the workpiece. As a result, one will achieve a safe and firm support of the tool head, even in the case of variable directions of stress. In addition, insertion and removal of the tool head will be made easier.

Preferably, the tool head is developed in such a way that the operating cutting edge of the cutting tool or bit lies in the middle plane of the tool head, and in that the upper and lower seating surfaces are similar in such a way that the tool head can be inserted in either the normal position or the overhead position. As a result, it will be possible to use one and the same tool head for the evermore-desired overhead working operation.

The tool head can be provided with at least one recess for the accommodation of a magazine containing the cutting bit. It is also possible to provide the tool head with two recesses for magazines for right-hand and left-hand working operations. It is also possible to provide the tool head with two recesses for magazines for working in normal position and in overhead position.

Preferably a rotatable clamping arrangement has been provided in the carrier holding the tool head, with the help of which the tool head can be clamped firmly. The clamping can be accomplished in all positions of the tool head with the same clamping mechanism. Preferably the clamping arrangement consists of a cylinder with a transversely extended threaded bore for the accommodation of a clamping screw for clamping the tool head. The cylinder is mounted rotatably in the carrier. Effectively, the carrier is provided with a cylinder-like recess of such dimension that the clamping screw can be put into an "upper" or "lower" position in which it is outside of the guide opening for the tool head, so that the tool head can be inserted without impediment into the guide opening. Thereafter, the clamping screw is swiveled into a corresponding slot of the tool head and can be clamped firmly. Effectively, the clamping arrangement is provided with a stop member for the tool head, which can be an eccentric stop disc arranged on the cylinder able to be swiveled into a corresponding recess of the tool head.

THE DRAWINGS

The invention is explained in more detail in the following paragraphs on the basis of a drawing of a few preferred embodiments in which:

FIG. 2 is a top view of the embodiment of FIG. 1;

FIG. 3 is a front view of the embodiment of FIG. 1;

DETAILED DESCRIPTION

Figure 1:
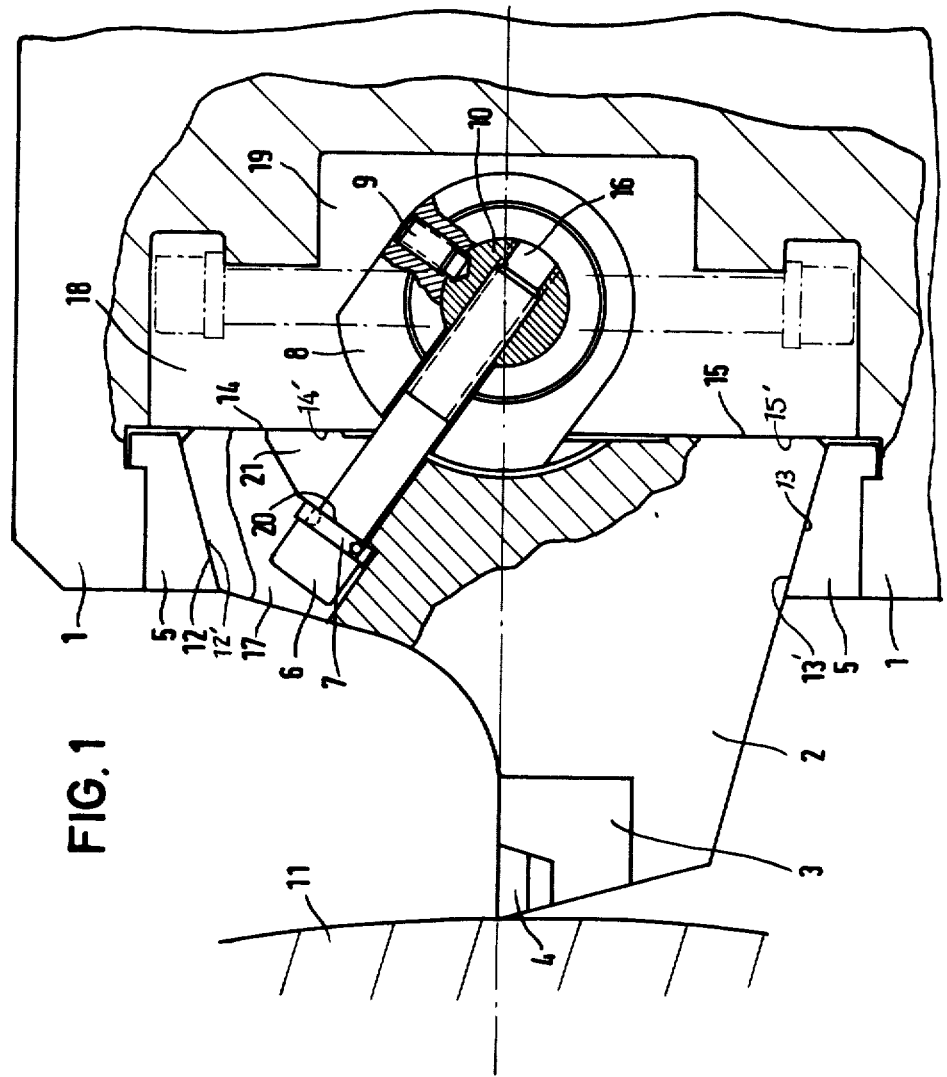
FIG. 1 shows a first embodiment of a tool head arrangement according to the invention in a side view, partially broken away.

In FIG. 1, the reference No. 1 generally designates the adjustable carrier of a lathe or turning machine on which the tool head is attached. The tool head is designated by 2. The tool head contains a recess for the accommodation of a cutting magazine 3 having an insertable cutting bit 4.

The carrier 1 contains a dove-tailed guide opening which is formed by replaceable guide strips 5. The tool head 2 has corresponding fitting surfaces 12 and 13 which can be pushed laterally into the guide opening (i.e., parallel to the axis of the workpiece) to engage seating surfaces 12', 13' of the guide opening. The tool head furthermore has fitting surfaces 14 and 15 which fit against corresponding fitting surfaces 14', 15' of the carrier 1.

For the purpose of attaching the tool head 2 to the carrier 1, preferably a rotatable clamping mechanism is used which comprises a rotatable cylinder 10 having a transversely extending threaded bore 16. A clamping screw 6 can be screwed into this threaded bore 16 and the possibility exists of rotating the clamping screw selectively into the positions shown in dash-dot lines, in which they are located in a slot 18 of the carrier 1 outside of the dove-tailed guide opening for the tool head 2. The position to which the screw is rotated depends upon the orientation of the tool head, as will be explained.

In order to make sure that the tool head 2, after clamping, is always in the correct lateral position, a slot has been provided in the head with which an eccentric disc 8 can engage, which disc is attached to the cylinder 10. Whenever the clamping screw is in one of the positions shown in dash-dot lines, the disc 8 engages within an additional slot 19 of the carrier 1. In this position no part of the disc 8 projects into the area of the guide opening for the tool head 2, so that the tool head can be pushed freely into or removed from its guide opening. Whenever the tool head 2 is in its correctly installed position, the clamping screw 6 is swiveled into the solid line position shown in FIG. 1. As a result, it engages within the slot 21 of the tool head, while the cam disc 8 engages within an additional part of this slot and functions as a stop to retain the tool head 2 in its position.

After the swiveling of the clamping screw into the solid line position of FIG. 1, the tool head 2 is clamped down by tightening the screw 6, whereby the screw head is supported by way of a washer 7 against a supporting surface 20. The tool head then is in its normal operating position.

However, it is easily possible to use the tool head 2 also in an overhead operating position. For this purpose, the tool head is rotated about its axis disposed horizontally in FIG. 1 and transversely of the rotary axis of cylinder 10, and is pushed into the guide. The cutting edge then is again located in the same position with regard to the workpiece 11, however, the slots 17 and 21 will then be "below" the turning center. Therefore, the screw is first swiveled into the lower position so that it can be swiveled from there after insertion of the tool head into the corresponding slot of the cutter head.

In order to make possible the rotation of the cylinder 10, the latter can be equipped on its front sides with an inside hexagon 10a or 10b into which a corresponding tool can be inserted (FIG. 2).

It will be seen, then, that the seating surfaces 14', 15' of the guide openings define upper and lower seating surfaces for supporting the tool head. The upper surface 14' is situated above the workpiece axis and the surface 15' is situated below such axis.

Figure 4:
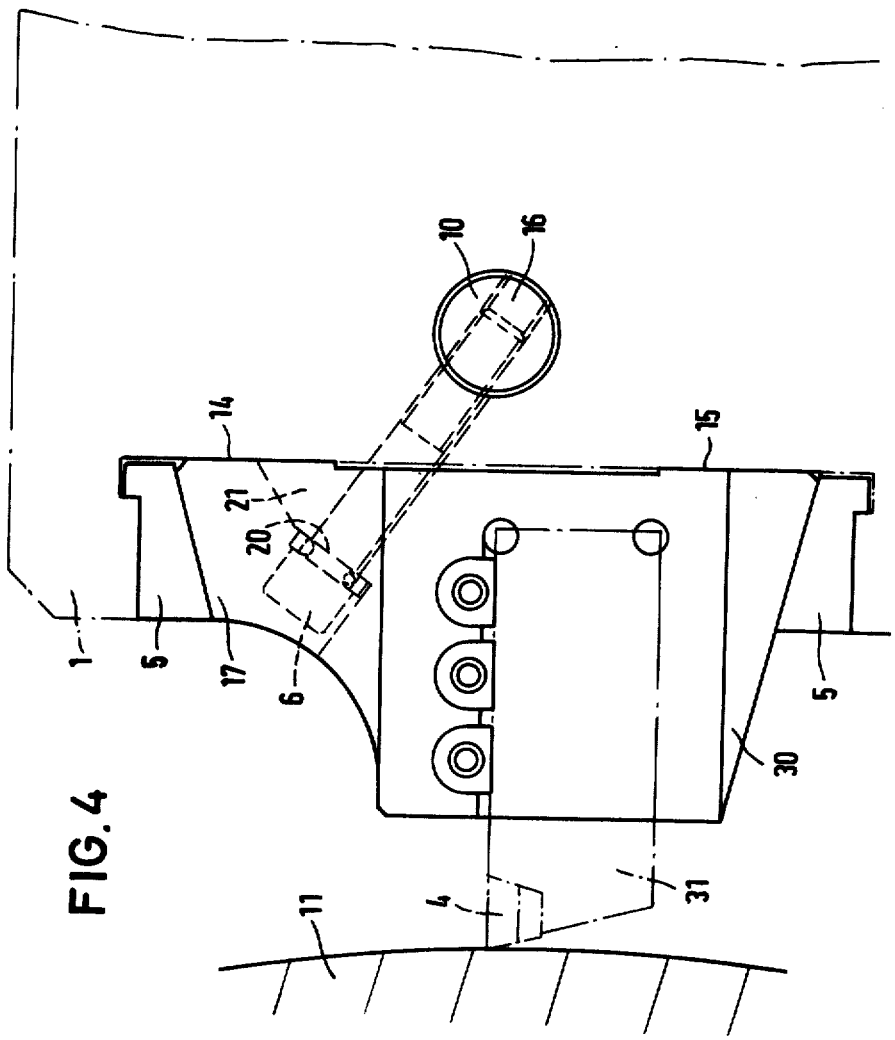
FIG. 4 is a side view of a second embodiment of the invention in the case of which the tool head contains two recesses for the accommodation of cutting bits of plural magazines.
Figure 5:
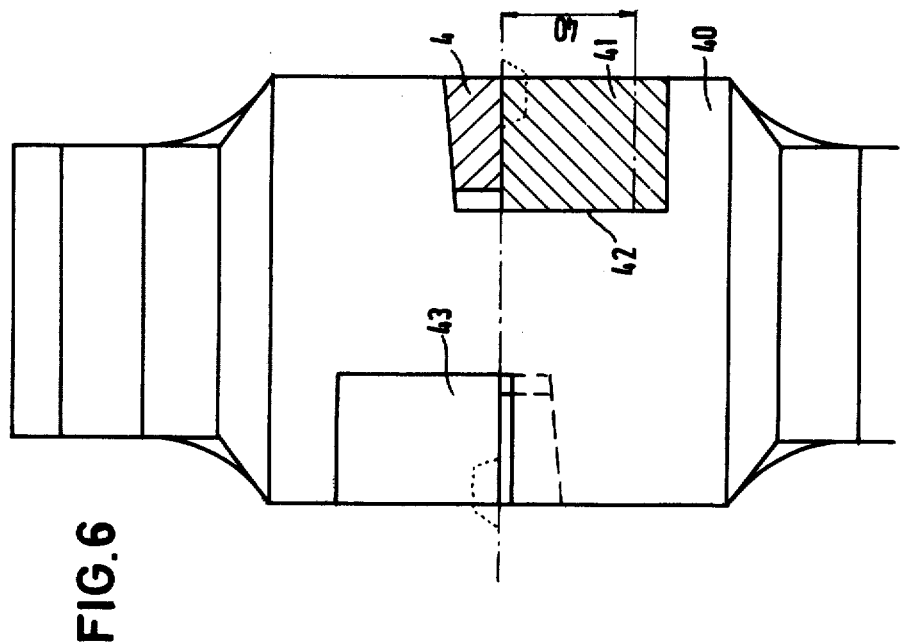
FIG. 5 is a front view of the embodiment of FIG. 4.

In the case of the embodiment according to FIGS. 4–5, the parts of the carrier 1 are the same as in the case of the embodiment according to FIGS. 1 to 3. Therefore, they have also been given the same reference numbers. The tool head in this case has been designated by 30. It contains recesses 32 and 33 for the accommodation of various magazines 31 for left-hand working operations and right-hand working operations.

Figure 6:
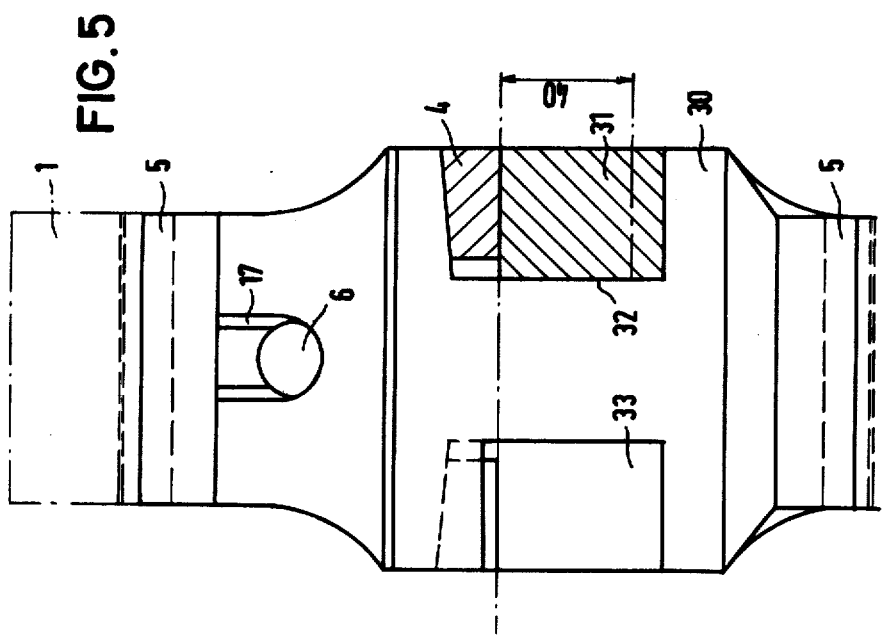
FIG. 6 is a schematic front view of a modified tool head having two recesses for the accommodation of cutting bits or magazines, whereby the recesses however are disposed in such a way that in one a magazine can be inserted in normal position and in the other a magazine in overhead position.

FIG. 6 shows schematically a further modified magazine 40 having recesses 42 and 43 for the accommodation of cutting inserts for the normal and overhead positions.

Figure 7:
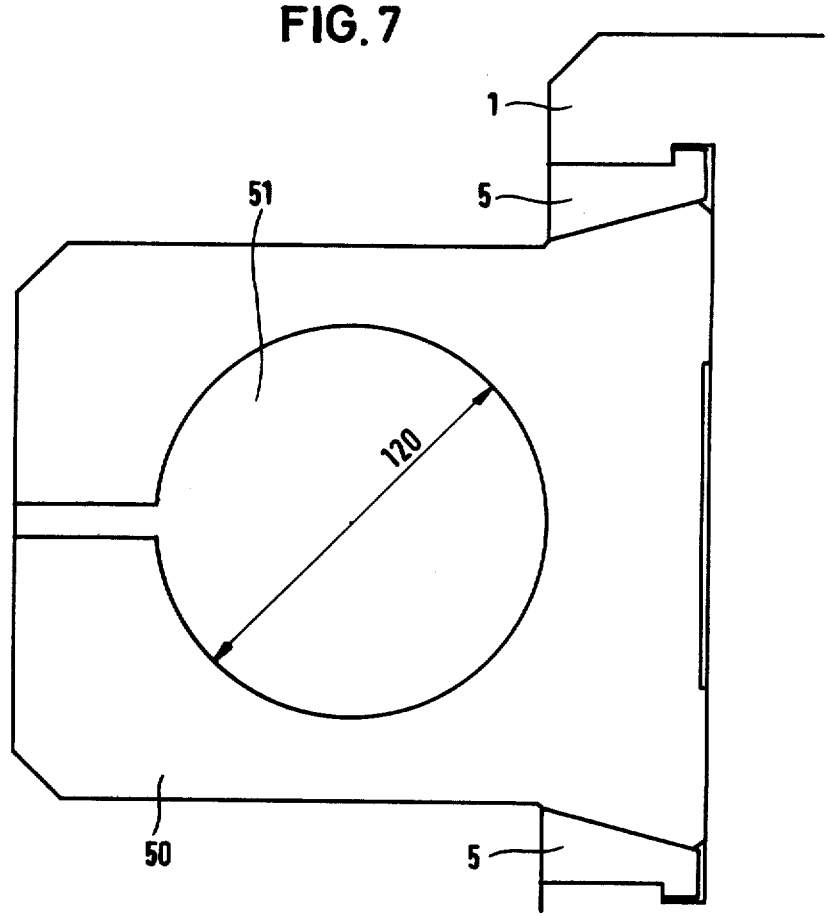
FIG. 7 is a further embodiment of a tool head for holding a boring bar.

FIG. 7 finally shows a further modified tool head 50 with a bore 51 for the accommodation of a boring bar.

The tool head arrangement of the invention can be used in the case of very different turning machines. Among other things, it makes possible the use of a single tool head for working in the normal position and in the overhead position. In the case of the hitherto known machines, it had been necessary to use different tool heads for this purpose, which were always suitable only for one of the types of working methods.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A tool heading mounting arrangement in a turning machine of the type having a carrier and tool head clamped against seating surfaces therein, said tool head being adjustable in position relative to the workpiece, said carrier containing an opening for receiving said tool head, said opening including an upper seating surface and a lower seating surface against which said tool head rests, a rotatable clamping means provided in the carrier for retaining said tool head in place, said clamping means comprising a body having a transversely running threaded bore for receiving a clamping screw for clamping the tool head, said body being mounted rotatably in the carrier, said carrier being provided with a recess dimensioned so that the clamping screw can be moved selectively into upper and lower positions in which it is displaced from the guide opening in the carrier to permit insertion and removal of a tool head.

2. Tool head mounting arrangement as in claim 1, characterized in that said opening is dove-tailed and extends essentially in a direction parallel to the axis of the workpiece.

3. Tool head mounting arrangement as in claim 1, characterized in that the tool head includes a cutter bit whose cutting edge lies in the center plane of the tool head; said upper and lower seating surfaces being identical so as to receive said tool head selectively in normal and overhead operating positions.

4. Tool head mounting arrangement as in claim 1, characterized in that the tool head includes at least one recess receiving a magazine containing a cutter bit.

5. Tool head mounting arrangement as in claim 4, characterized in that the tool head is provided with two recesses for receiving magazines for right-hand and left-hand working.

6. Tool head mounting arrangement as in claim 4, characterized in that the tool head is provided with two recesses for receiving magazines for working in normal position and in overhead position.

7. Tool head mounting arrangement as in claim 1, characterized in that the stop member comprises an eccentric disc mounted on the cylinder, said disc being rotatable into a corresponding slot of the tool head.

8. Tool head mounting arrangement as in claim 1, characterized in that the rotatably mounted body is a cylinder.

9. Tool head mounting arrangement as in claim 1 characterized in that the clamping means includes a stop member for preventing removal of the tool head.

10. Tool head mounting arrangement as in claim 8 characterized in that the clamping means includes a stop member for preventing removal of the tool head.

* * * * *